Feb. 6, 1968   H. E. WHITTLE   3,367,315
SUBMARINE INTERNAL COMBUSTION ENGINE
Filed March 29, 1967
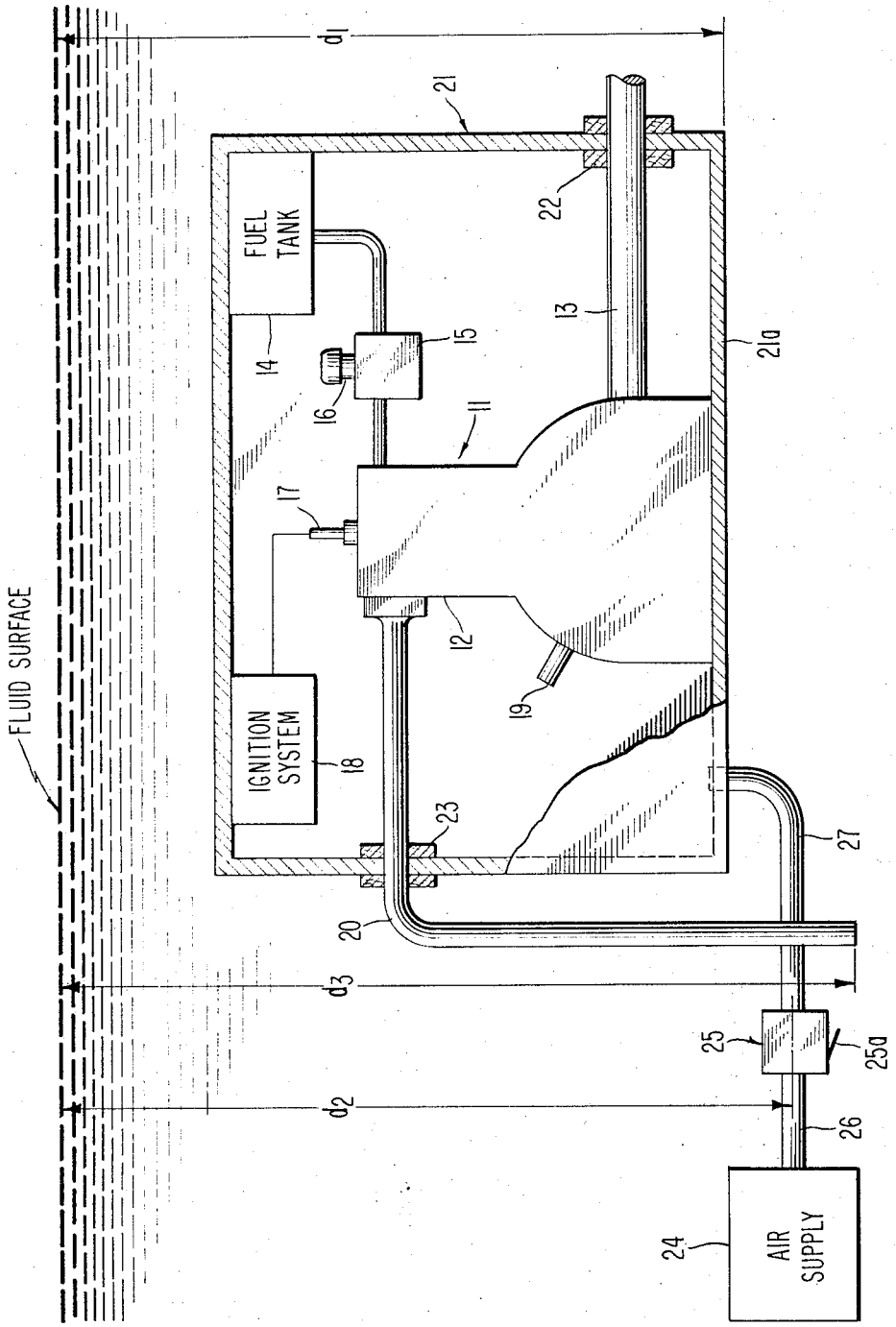
INVENTOR.
HARRY E. WHITTLE
BY
*Thomas P. Murphy*
ATTORNEY

United States Patent Office

3,367,315
Patented Feb. 6, 1968

3,367,315
SUBMARINE INTERNAL COMBUSTION ENGINE
Harry E. Whittle, 1208 Malinda Road,
Oreland, Pa. 19075
Filed Mar. 29, 1967, Ser. No. 626,838
10 Claims. (Cl. 123—198)

ABSTRACT OF THE DISCLOSURE

An apparatus to permit operation of an internal combustion engine in a fluid environment wherein a conventional internal combustion engine is disposed in a fluid tight chamber. The exhaust pipe of the engine is extended through the chamber downwardly into the fluid. A pressurized source of air is connected to the chamber through a regulator valve which maintains the pressure within the chamber equal to or somewhat less than the pressure of the fluid at the end of the exhaust pipe regardless of the depth at which the chamber is positioned within the fluid while at the same time continuously providing an adequate supply of air to permit the internal combustion engine to operate.

---

This invention relates to an apparatus for use with an internal combustion engine and more particularly to an apparatus enabling an internal combustion engine to be operated in varying depths of water.

Most arrangements presently used for the underwater operation of conventional internal combustion engines are generally limited to operation within a few feet of the surface of the water. This is so because such arrangements require means for communicating, e.g., snorkeling devices, with the atmosphere. Other arrangements employ elaborate purifying and filter arrangements to reconvert exhaust fumes to a combustion supporting mixture. Such a mixture must then be passed through a compressor and control arrangement before being supplied to the air intake of the engine.

The present invention relates to an apparatus for use with any conventional internal combustion engine which permits the engine to be operated at any depth without need for communication with the atmosphere above the water's surface or without requiring means for converting exhaust fumes to a reusable combustion mixture.

Specifically, the present invention contemplates structural arrangements including a chamber for enclosing those parts of an internal combustion engine normally open to the atmosphere in a fluid tight configuration. The exhaust pipe of the internal combustion engine is extended through the chamber having its open end normally facing a direction opposite to the surface of the water. A source of pressurized air is connected to the chamber via a demand regulator. The demand regulator permits air to enter the chamber when the air pressure within said chamber becomes less than the pressure of the water in the vicinity of the demand regulator and permits air to escape from the chamber when the air pressure therein becomes more than the water pressure at the demand regulator. The relative positions of the exhaust pipe opening, the demand regulator and the chamber are such as to permit operation of the engine virtually independently of depth and in a dry condition whether or not the engine is in a running or stopped condition.

Therefore, it is an object of the present invention to provide an apparatus to permit operation of a internal combustion engine at any depth below the surface of a fluid such as water.

Another object of the present invention is to provide an apparatus adaptable for use with any conventional air consuming engine to permit operation of the engine under water without limitation on the depth at which the engine may be efficiently operated.

A further object of the present invention is to provide a structural arrangement for use with an internal combustion engine for maintaining a fluid tight, dry environment surrounding the engine at an air pressure predetermined relative to the water pressure in the vicinity of the engine's exhaust port.

Yet another object of the present invention is to provide an apparatus for use with an internal combustion engine wherein a fluid tight chamber enclosing the engine is supplied with sufficient air at the correct pressure to permit operation of the engine at any water depth without need for external communication with the atmosphere or for the use of exhaust fume purifying means.

Other objects and many of the attendant advantages of the present invention will become more apparent with the reading of the following description in conjunction with the attached drawing wherein the figure illustrates in block diagram form a preferred embodiment of the present invention.

Referring now more particularly to the figure there is shown an internal combustion engine 11. The internal combustion engine 11 may be of any conventional type, e.g., it may be a motor of the type commonly used to drive small boats. The internal combustion engine 11 comprises a block and crankcase 12 containing one or more cylinders and pistons arranged to drive a shaft 13. The shaft 13 in turn rotates a propeller (not shown) to provide locomotion in water.

A fuel tank 14 is connected to intake manifold-carburetor 15 wherein the fuel is mixed with air before insertion into the cylinders contained in the block-crankcase 12. An opening represented by pipe 16 serves as the means through which air is taken into the intake manifold-carburetor 15.

Each of the cylinders has an associated spark plug 17 connected to an ignition system 18. A pipe 19, opening into the block-crankcase 12 serves as a crankcase breather.

The engine is water cooled in any conventional manner; e.g., by a pump and inlet-outlet water pipes leading into and out of the block-crankcase 12.

The block-crankcase 12 is provided with an exhaust pipe 20 connected to the cylinder to relieve it of exhaust fumes during the exhaust stroke of the piston.

The internal combustion engine 11 described above is conventional and is of a type which normally functions in the open atmosphere.

In order to provide an engine which is operational submerged at any depth below the surface of the water, the engine 11 is disposed in a fluid tight housing 21. The housing may be made of a rigid or semi-rigid material for, as to be explained more fully hereinbelow, the air pressure within the housing is automatically maintained at a value greater than the surrounding water pressure. Furthermore, if desired the housing need not enclose the entire engine but may cover only those portions of the engine normally open to the atmosphere. The housing 21 comprises a bottom surface 21a to which the block-crankcase 12 may be rigidly secured in any convenient manner.

The drive shaft 13 extends through the housing via fluid-tight seal 22. The seal 22 may be of any conventional design capable of sealing against pressure differences in either direction. However, the air pressure within the housing will normally be higher than the pressure of surrounding water making uni-directional seals feasible. Means may be provided on the external portion of the drive shaft to manually start the engine. Of course, an automatic starter may be included within the housing.

The exhaust pipe 20 also passes through the housing 21 via a seal 23 similar to seal 22. The exhaust pipe 20 extends downwardly and opens in a direction opposite from the water surface as shown.

A pressurized source of air 24 contained in a tank similar to the type used in scuba diving is provided.

A demand regulator 25 of a type well known in the art is connected to the source of pressurized air 24 by means of a duct 26. The demand regulator 25 controls the supply of air to the housing 21 via a duct 27 in a manner to be described more fully hereinbelow.

In practice the source of air 24 and the demand regulator 25 are rigidly attached to the housing 21 to make a single compact unit which when used in conjunction with conventional motors is freely portable.

The demand regulator 25 is pressure sensitive; i.e., the difference between the pressure of the water surrounding the regulator 25 and the pressure of the air in the duct 27 (and therefore in the housing 21) determine its regulatory function. For example, if the air pressure in the duct 27 is less than the pressure of the water at the depth where the demand regulator 25 happens to be, more air from supply 24 will be passed by the demand regulator 25 until an equilibrium condition is reached. If the air pressure in the duct 27 is greater than the pressure of the water surrounding the demand regulator 25, air in the duct 27 (and therefore in the housing 21) will escape through the regulator exhaust check valve schematically shown as a valve 25a.

In the embodiment shown the bottom wall 21a of the housing 21 is at a distance $d_1$ below the surface of the water. The pressure sensitive portion of the demand regulator 25 is at a distance $d_2$ which is somewhat greater than the distance $d_1$. The opening of the exhaust pipe 20 is at a distance $d_3$ which is somewhat greater than the distance $d_2$. This relationship may be expressed:

$$d_1 < d_2 < d_3$$

During the time the internal combustion engine is at some predetermined depth in a non-operating condition a static equilibrium condition exists; i.e., the pressure in the housing 21 and in all the internal air spaces that would normally be exposed to the atmosphere is slightly less than the water pressure acting on the demand regulator 25. The pressure in the exhaust pipe 20 is equal to the water pressure at distance $d_3$ at the end of the exhaust pipe 20.

If the system is moved to a position closer to the surface, the pressure balance is lost; i.e., the pressure in the housing 21 becomes greater than the water pressure on the demand regulator 25. When this occurs, air in the housing 21 escapes through the exhaust check valve 25a. The expanding air captured in the exhaust pipe 20 escapes through the open end thereof into the water. A new equilibrium condition is thus automatically reached.

When the system is lowered in the water, the water pressure on the demand regulator 25 increases over the air pressure within the housing 21. Thus, the demand regulator 25 automatically passes sufficient air from the pressurized source of air 24 into the housing to re-establish the equilibrium condition. Since the captured air in the exhaust pipe 20 compresses, water moves up into the exhaust pipe 20 until there is again a balance.

When the internal combustion engine 11 is turned on at any desired depth, the present invention further serves to provide appropriate equilibrium conditions much the same as if the engine were operated above the surface of the water.

When the engine is turned on, the air pressure within the housing 21 decreases due to air intake by the carburetor 15. This is sensed as a change in pressure differential by the demand regulator 25 which permits more air to enter the housing 21. This is a continuous process and causes the equilibrium condition to be maintained while the engine is running. During each exhaust stroke of the piston or pistons the increased pressure in the exhaust pipe 20 causes the exhaust fumes to escape therefrom. The pressure in the exhaust pipe 20 would under conventional operating conditions be substantially equal to carburetor intake pressure which is at atmospheric pressure. Due to this invention this same condition of equality may be maintained. This condition of equality is maintained by positioning the open end of the exhaust pipe 20 at or near the level of the demand regulator 25. In the present embodiment, however, the open end of the exhaust pipe 20 is maintained at a depth slightly more than the depth at which the demand regulator 25 is positioned. This is done to assure that sufficient water will back up into the exhaust pipe to keep it closed during equilibrium conditions. This back up of water also allows for a certain amount of tilt of the whole unit without loss of equilibrium pressure from the exhaust pipe 20. The pipe 20 may be extended further or less into the water if desired to change the equilibrium.

Thus, it is seen that an equilibrium condition similar to that present in open air operation of an internal combustion engine is maintained at any depth regardless of whether or not the engine is on or off.

In the embodiment shown the water pressure acting on the upper walls and the top of the housing 21 is less than the air pressure within the housing. In such a situation, the housing could be made of a non-rigid or even inflatable material. Use of a completely inflatable material might call for a lowering of the demand regulator 25 relative to the housing to assure a large enough differential pressure between the ambient water and the air within the housing. Varying of the position of the demand regulator relative to the housing will, of course, vary the air pressure within the housing 21 above or below the pressure of the water surrounding the demand regulator 25.

The open end of the exhaust pipe 20 should be kept at substantially the same depth as the demand regulator to retain the equilibrium condition.

As aforesaid it is necessary to house only those portions of an internal combustion engine which are normally open to the atmosphere when the engine is running above the surface of the water.

Any internal combustion engine may be easily modified in accordance with the present invention. The present invention would be particularly useful to scuba divers who desire a convenient inexpensive means of underwater locomotion.

In a practical application of this invention it is desirable to provide means to vary the fuel/air mixture ratio to compensate for the variation in the density of the air in the housing, the air density varying in proportion to the ambient pressure at the operating depth. The fuel/air mixture ratio may be varied manually by means of control linkages to the mixture controls with which small engine carburetors are normally equipped. The mixture controls may also be automatically controlled by pressure sensing devices located either outside or within the waterproof housing, the latter approach being most desirable. Such control devices are well known in the art and are commonly used for mixture compensation on aircraft engines which are similarly exposed to variations in ambient pressures.

Various other modifications of the present invention are possible in light of the above disclosure which should not be construed as limiting the present invention beyond those limitations imposed by the following claims.

What is claimed is:

1. In combination with an internal combustion engine normally adapted to operate in the atmosphere,
   a fluid tight housing enclosing all the parts of the internal combustion engine normally requiring access to the atmosphere for maintaining a dry environment for said parts when the internal combustion engine is submerged in water,
   means automatically maintaining the air pressure within said housing greater than the pressure of the surrounding water regardless of the depth to which the internal combustion engine is submerged.

2. The combination according to claim 1 wherein said means comprises, a pressurized source of air, valve means connecting said source of air to said housing permitting air to enter said housing from said source of air when the air pressure within said housing is less than the water pressure surrounding said valve means and permitting air to escape from said housing when the air pressure is greater than the water pressure surrounding said valve means.

3. The combination according to claim 2 further including, conduit means for extending the exhaust port of the internal combustion engine through said housing terminating substantially at the same position relative to said housing as said valve means in an opening facing opposite from the surface of the water.

4. The combination according to claim 2 wherein said valve means comprises, a demand regulator disposed adjacent to that portion of said housing submerged at the greatest depth within the water.

5. The combination according to claim 4 further including, conduit means for extending the exhaust port of the internal combustion engine through said housing terminating in a downwardly facing opening at substantially the same depth as said demand regulator.

6. The combination according to claim 5 wherein, said housing is composed of a waterproof, flexible material.

7. The combination according to claim 5 wherein, said conduit means terminates at a position slightly below the position of said demand regulator.

8. The combination according to claim 5 wherein, said source of air and said demand regulator are fixed to that portion of said housing which extends deepest into the water.

9. The combination according to claim 5 wherein, said demand regulator is so positioned that the air pressure in said housing will always be slightly less than the water pressure surrounding said demand regulator and slightly more than the water pressure surrounding said housing.

10. The combination according to claim 9 wherein, said housing is composed of a waterproof, flexible material.

References Cited

UNITED STATES PATENTS

| 2,333,686 | 11/1943 | Sheffield | 114—16 |
| 2,337,318 | 12/1943 | Eliuk | 114—16 XR |

FOREIGN PATENTS 833,398　4/1960　Great Britain.

WENDELL E. BURNS, *Primary Examiner.*